(12) United States Patent
Walker

(10) Patent No.: US 7,938,136 B1
(45) Date of Patent: May 10, 2011

(54) METHOD FOR SEALING TAPS

(76) Inventor: Roger H. Walker, Tulsa, OK (US)

( * ) Notice: Subject to any disclaimer, the term of this patent is extended or adjusted under 35 U.S.C. 154(b) by 330 days.

(21) Appl. No.: 12/132,256

(22) Filed: Jun. 3, 2008

(51) Int. Cl.
*F16L 55/168* (2006.01)

(52) U.S. Cl. ............ 137/15.09; 137/315.01; 138/97; 138/99; 285/15

(58) Field of Classification Search ........... 137/15.08, 137/15.17, 315.01, 15.09; 156/171, 173; 138/97, 99; 285/15
See application file for complete search history.

(56) References Cited

U.S. PATENT DOCUMENTS

| | | | | |
|---|---|---|---|---|
| 3,521,858 A | * | 7/1970 | Albro | 251/315.01 |
| 3,751,004 A | * | 8/1973 | Quirk | 156/173 |
| 3,857,546 A | * | 12/1974 | Quirk | 251/315.05 |
| 3,963,185 A | * | 6/1976 | Quirk | 156/172 |
| 3,967,839 A | | 7/1976 | Dunmire | |
| 4,504,086 A | * | 3/1985 | Carrow | 285/133.5 |
| 5,586,749 A | * | 12/1996 | Conley et al. | 251/315.05 |
| 5,660,199 A | | 8/1997 | Maichel | |
| 5,894,864 A | * | 4/1999 | Rich | 138/99 |
| 6,307,990 B1 | | 10/2001 | Carberry et al. | |
| 6,703,091 B1 | | 3/2004 | Walker | |
| 6,745,795 B2 | | 6/2004 | McGivery | |
| 7,311,114 B2 | | 12/2007 | Morrison et al. | |
| 7,740,028 B1 | * | 6/2010 | Wilson et al. | 138/99 |

* cited by examiner

*Primary Examiner* — Kevin L Lee
(74) *Attorney, Agent, or Firm* — Molly D. McKay

(57) ABSTRACT

An inexpensive method for quickly and safely sealing illicit taps in a pipe, such as for example a pipe through which a combustible material like oil or gasoline is flowing. The method first seals the valve outlet of the illicit tap with epoxy and removes the valve handle from the valve. Finally the entire tap including the valve and surrounding pipe area is wrapped with an epoxy impregnated material such as fiberglass or carbon composite fabric.

10 Claims, 2 Drawing Sheets

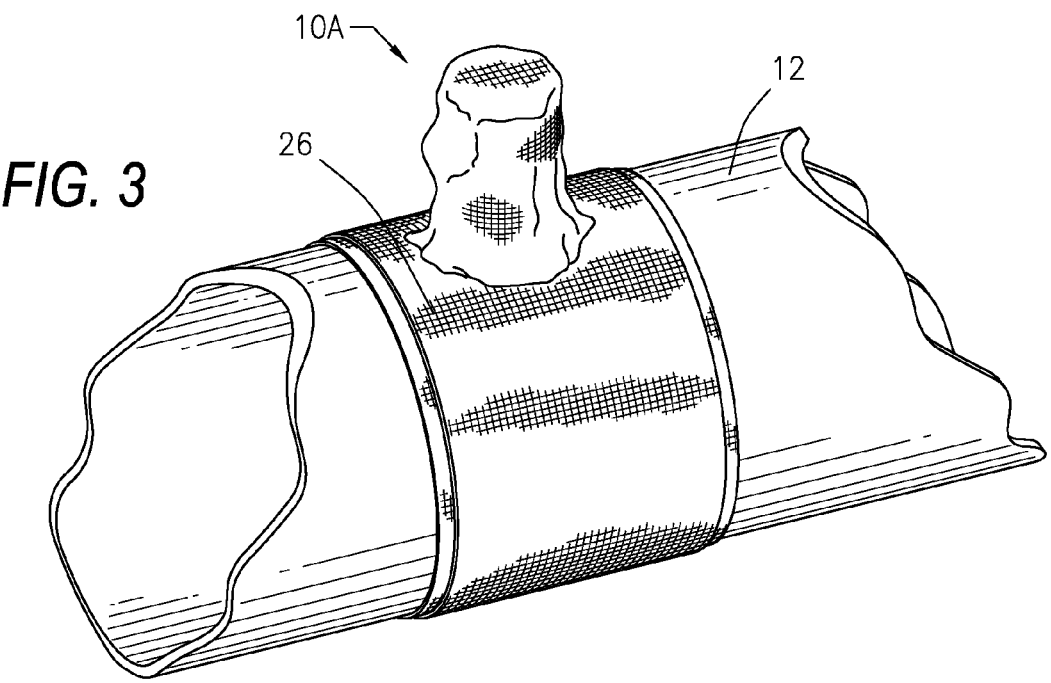

METHOD FOR SEALING TAPS

BACKGROUND OF THE INVENTION

1. Field of the Invention

The present invention is an inexpensive method for quickly and safely sealing illicit taps in a pipe, such as for example a pipe through which a combustible material like oil or gasoline is flowing. The method first seals the valve outlet of the illicit tap with epoxy and removes the valve handle from the valve. Finally the entire tap including the valve and surrounding pipe area is wrapped with an epoxy impregnated material such as fiberglass or carbon composite fabric.

2. Description of the Related Art

A common problem around the world is illicit taps on petroleum pipes and pipelines. Thieves install these illicit taps in the pipes by first welding a coupling on the pipe, screwing a cheap valve onto the coupling and then drilling thru the valve to access the oil or gasoline that is located in the pipe. They then hook a hose up to the valve and run the hose to a tank or truck that is sometimes located a kilometer or more away from the illicit tap. Using this illicit tap, the thieves can then covertly steal petroleum product from the pipe or pipeline.

There are currently three different methods being used to repair these illicit taps once they are discovered by the pipeline's owner. The first method for repairing illicit taps involves shutting down the pipeline, cutting out the tap and welding a patch over where the illicit tap had been located in the pipe. This method is costly because it requires that the pipeline be shut down to make the repair to the pipe. Also, this method is dangerous because it involves cutting the tap out of the pipeline that will generally still have some residual combustible material present within the pipe.

A second method for repairing illicit taps involves driving a wooden plug into the hole, then cutting off the tap and welding a patch over the wooden plug. This method is less costly from the standpoint that the pipeline does not have to be completely drained to accomplish this repair. If the pipeline is shut down but has some residual head, the wooden plug can stop minimal flow while the repair is made. However, this method is extremely hazardous to the person doing the repair and often results in serious injury or death to the person doing the repair.

The third method for repairing illicit taps involves putting a very large and very expensive hot tapping machine over the tap and cutting out the tap. Although this method is relatively safe, it is extremely expensive.

Another problem with some of the repair methods is that they generally do not address the problem of weakness created in the area around where the coupling was welded to the pipe. When the weakness of this area is subjected to wear or pressure, the pipe can fail, resulting in a pipeline leak or rupture.

The present invention addresses the problems presented by the currently employed methods for repairing illicit taps by providing an inexpensive, fast, and safe method for accomplishing the repair. The present method does not require the pipeline to be shut down. Also, the present method does not present a hazard to the person making the repair since it does not involve generating any sparks or heat as is required by other methods where metal must be cut to accomplish the repair. Further, the present method is relatively inexpensive and does not require expensive equipment or materials.

The present method seals the valve outlet of the tap with epoxy and removes the valve handle before encapsulating the tap and surrounding pipe with epoxy impregnated material, preferably fiberglass or carbon composite fabric. This repair makes the tap safe and very difficult to reuse. It is much easier for a thief to make a new tap instead of trying to use a tap that has been repaired by this method. Another advantage to the present invention is that the repair cannot be welded onto since the wrap material is composed of either fiberglass or carbon composite.

Also, because the entire tap and surrounding pipe area are wrapped and sealed, even if the valve leaks or the weld around where the coupling was welded to the pipe fails, the repair will prevent the pipe from leaking.

SUMMARY OF THE INVENTION

The present invention is an inexpensive method for quickly and safely sealing illicit taps in a pipe, such as for example a pipe through which a combustible material like oil or gasoline is flowing. The method first seals the valve outlet of the illicit tap with epoxy and removes the valve handle from the valve. Then the entire tap including the valve and surrounding pipe area is wrapped with an epoxy impregnated material such as fiberglass or carbon composite fabric. The epoxy is allowed to cure and the repair is complete. The epoxy impregnated material is preferably fiberglass or carbon composite fabric such as taught in U.S. Pat. No. 6,703,091. That patent issued on Mar. 9, 2004 for Structural Lining System for Pipes and Method for Applying Same. The teaching of that patent is hereby included by reference.

BRIEF DESCRIPTION OF THE DRAWINGS

FIG. 3 is a perspective view of the pipe of FIG. 2 showing the tap, valve and surrounding pipe completely wrapped with epoxy impregnated wrap material to complete the repair of the illicit tap.

DETAILED DESCRIPTION OF THE PREFERRED EMBODIMENT

Figure 1:
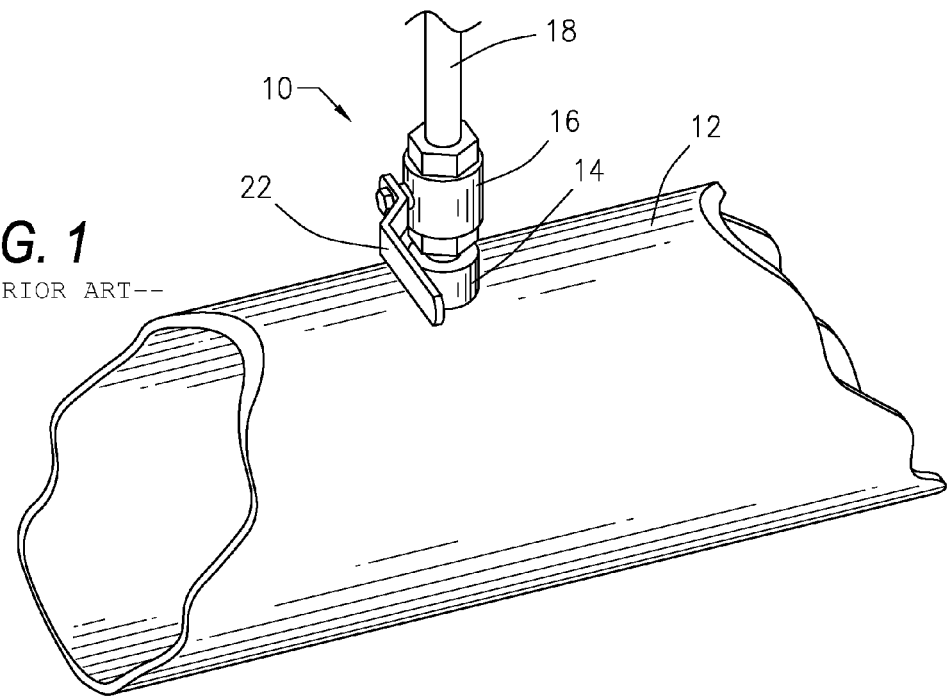
FIG. 1 is a perspective view of a pipe on which an illicit tap has been installed.

Referring to the drawings, the present invention is a fast, safe and inexpensive method for quickly and safely sealing an illicit tap 10 in a pipe or pipeline 12, such as for example in a pipe 12 through which a combustible material like oil or gasoline is flowing. This method does not require the pipeline 12 to be shut down to accomplish the repair and does not involve the generation of heat or sparks that might tend to ignite the combustible material contained within the pipe 12. In fact, the combustible material should not escape from the pipe 12 when making this repair. Also, the present method does not require expensive equipment or materials. The materials needed to accomplish this repair are light weight so that the user could easily carry the necessary materials to remote locations.

Referring now to FIG. 1, there is illustrated an illicit tap 10 that has been made in a pipe 12. The illicit tap 10 consists of a coupling 14 that has been welded to the pipe 12 and a valve 16 threaded onto the coupling 14. As illustrated, a hose 18 attaches to an outlet 20 of the valve 16.

Figure 2:
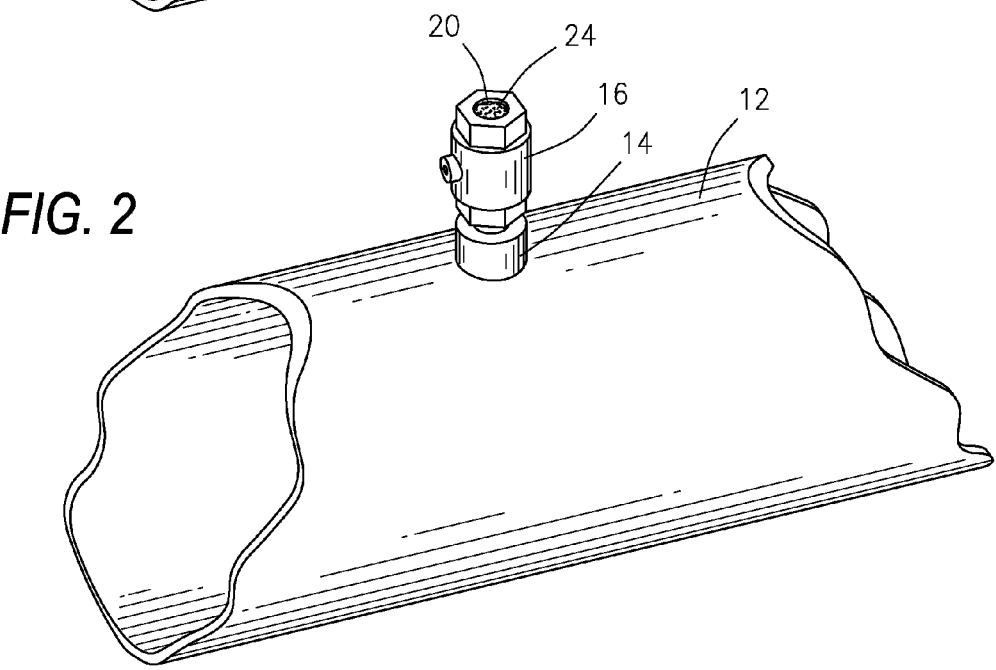
FIG. 2 is perspective view of the pipe of FIG. 1 showing the hose removed from the valve of the illicit tap, the valve outlet filled with epoxy to seal it and the valve handle removed from the valve.

As illustrated in FIG. 2, the present method first moves the valve handle 22 to place valve 16 in a closed position and then removes the hose 18 from the outlet 20 of the valve 16. Next, the valve outlet 20 of the illicit tap is permanently sealed by filing the outlet 20 with an epoxy 24 that forms a sealing plug in the outlet 20 to prevent any leakage of combustible material through the valve 16. Also the valve handle 22 is removed from the valve 16 in preparation for wrapping the entire valve 16 with an epoxy impregnated material 26. At that point, the epoxy plug 24 can be allowed to harden within the valve outlet 20 or the process can continue without allowing time for the epoxy 24 to harden before the tap 10 is wrapped.

Next, as illustrated in FIG. 3, the pipe 12 surrounding the tap 10 and the entire tap 10 including the valve 16 and the coupling 14 are wrapped with an epoxy impregnated material 26 to fully encapsulate the tap 10 and the surrounding pipe 12. The epoxy impregnated material 26 is preferably fiberglass or carbon composite fabric such as taught in U.S. Pat. No. 6,703,091. That patent issued on Mar. 9, 2004 for Structural Lining System for Pipes and Method for Applying Same. The teaching of that patent is hereby included by reference.

At this point, the epoxy plug 24 and the epoxy impregnated material 26 are allowed to cure and the repair is completed. The repaired tap 10A is shown in FIG. 3.

This method of repair makes the repaired tap 10A safe and makes the repaired tap 10A very difficult to reuse. It is much easier for a thief to make a new tap 10 instead of trying to use a repaired tap 10A that has been repaired by this method. Another advantage to the present invention is that the repaired tap 10A cannot be welded onto since the wrap material 26 is composed of material to which weld cannot be adhered, i.e. either fiberglass or carbon composite material.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A method for sealing taps in a pipe comprising:
a. sealing a valve outlet of a tap with epoxy,
b. removing a valve handle from a valve, and
c. wrapping the entire tap and surrounding pipe area with an epoxy impregnated material.

2. A method for sealing taps in a pipe according to claim 1 wherein the epoxy impregnated material is selected from the following list:
fiberglass fabric and carbon composite fabric.

3. A method for sealing taps in a pipe according to claim 1 further comprising the following step that is completed before step a:
d. removing a hose from the valve outlet of the tap.

4. A method for sealing taps in a pipe according to claim 3 further comprising the following step which occurs after step a:
e. allowing the epoxy to cure in the valve outlet to form a sealing plug.

5. A method for sealing taps in a pipe according to claim 4 further comprising the following step which occurs after step c:
f. allowing the epoxy impregnated material to cure.

6. A method for sealing taps in a pipe comprising:
a. removing a valve handle from a valve,
b. sealing a valve outlet of a tap with epoxy, and
c. wrapping the entire tap and surrounding pipe area with an epoxy impregnated material.

7. A method for sealing taps in a pipe according to claim 6 wherein the epoxy impregnated material is selected from the following list:
fiberglass fabric and carbon composite fabric.

8. A method for sealing taps in a pipe according to claim 6 further comprising the following step that is completed before step b:
d. removing a hose from the valve outlet of the tap.

9. A method for sealing taps in a pipe according to claim 8 further comprising the following step which occurs after step b:
e. allowing the epoxy to cure in the valve outlet to form a sealing plug.

10. A method for sealing taps in a pipe according to claim 9 further comprising the following step which occurs after step c:
f. allowing the epoxy impregnated material to cure.

* * * * *